Sept. 23, 1958 H. J. GRAY, JR 2,853,632

TRANSISTOR LOGICAL ELEMENT

Filed Sept. 8, 1955

INVENTOR.
HARRY J. GRAY, JR.
BY
Charles C. English
AGENT

United States Patent Office 2,853,632

Patented Sept. 23, 1958

2,853,632

TRANSISTOR LOGICAL ELEMENT

Harry J. Gray, Jr., Springfield, Pa., assignor to Sperry Rand Corporation, New York, N. Y., a corporation of Delaware Application September 8, 1955, Serial No. 533,134

2 Claims. (Cl. 307—88.5)

Figure 1:
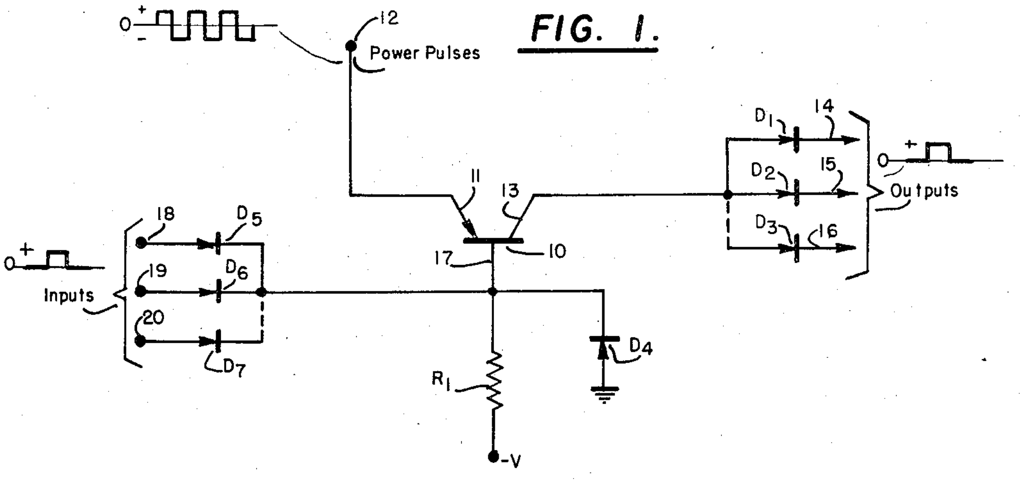

The present invention relates to logical elements such as may be employed in computation devices, and is more particularly concerned with a logical element utilizing a transistor, and capable of providing selective pulse type outputs in response to the presence or absence of signal inputs. In a preferred form of the present invention, the transistor logical element may act as a complementing amplifier wherein outputs are obtained in the absence of an input to the element, and wherein the presence of a signal input results in their being no output. Modifications of this concept will become apparent from the subsequent description.

In the past, logical elements capable of providing pulse type outputs in response to the presence or absence of a signal input, preferably of the pulse type, have often required the utilization of transformers or amplifier devices, for instance of the magnetic type. Such known forms of logical elements have, as a result, been relatively complex in construction and costly to provide.

The present invention serves to obviate this complexity and provides an improved logical element capable of utilization, for instance, in digital computation systems, wherein a single transistor may be arranged to provide a desired logical operation. In particular, such an improved logical element may comprise a transistor having a source of regularly occurring spaced energization pulses coupled to one electrode thereof; and a clamping circuit coupled to a further electrode thereof. The clamping circuit is designed to normally maintain a predetermined potential on said further electrode, whereby the transistor exhibits a predetermined state of conductivity during the application of each of the aforementioned energization pulses. The said clamping circuit may be rendered selectively inoperative in response to signal inputs, thereby to cause the transistor to exhibit a state of conductivity opposite to said predetermined state.

When the logical element of the present invention is employed as a complementing amplifier, each applied energization pulse may cause the transistor to be rendered conductive, and a signal input, by disconnecting the aforementioned clamp, will in turn render the transistor non-conductive, notwithstanding the application of an energization pulse. By this extremely simple structure, therefore, a complementing amplifier is provided without the use of transformers or other complex and costly structures. As will become apparent from the subsequent description, the logical element of the present invention lends itself to direct coupling or capacitive coupling between the element itself and one or more output points; and further may be operated at relatively high repetition rates. In addition, by suitable selection of the waveform of energization pulses employed, for instance, transistor clean-up may be provided in the circuit thereby to increase the possible speed of operation.

It is accordingly an object of the present invention to provide an improved logical element.

A further object of the present invention resides in the provision of a logical element capable of utilization in computation devices and employing a transistor.

Another object of the present invention resides in the provision of an improved complementing amplifier.

A still futrher object of the present invention resides in the provision of a logical element which is simpler in construction and less costly than other forms of logical elements known heretofore.

Still another object of the present invention resides in the provision of an improved transistor logical element capable of operation at high repetition rates.

Another object of the present invention resides in the provision of a complementing amplifier having better operating characteristics than has been the case heretofore.

Figure 2:
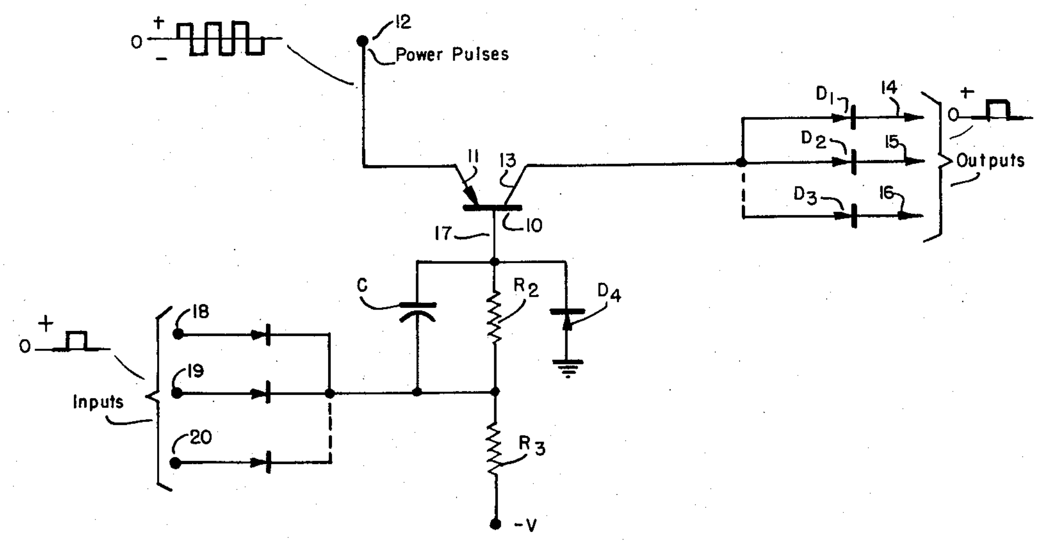

These and further objects and advantages of the present invention will become more readily apparent from the subsequent description and accompanying drawings, in which:

Figure 1 is a schematic diagram of a logical element constructed in accordance with a preferred embodiment of the present invention and acting as a complementing amplifier; and Figure 2 is a schematic diagram of a possible modified form of logical element constructed in accordance with the present invention.

Referring now to Figure 1, it will be seen that, in accordance with the present invention, a logical element acting, for instance, as a complementing amplifier may comprise a transistor 10 having its emitter 11 coupled to a source 12 supplying regularly occurring spaced power pulses exhibiting positive and negative going excursions, as illustrated. The collector 13 of the transistor 10 may be coupled to one or more output points 14, 15 and 16, via rectifiers D1, D2 and D3, for instance. While diode coupling to the load has been illustrated, it must be understood that capacitive coupling may also be utilized in place of or in combination with the several rectifiers D1, D2 and D3. In addition, in some applications, the rectifiers D1, D2 and D3 may be omitted completely. Similarly, if a plurality of amplifiers, of the type illustrated in Figure 1, are connected in cascade, the functions of output rectifiers D1, D2 and D3 may be performed by input rectifiers of a subsequent stage, corresponding to rectifiers D5, D6, or D7, to be discussed.

The base 17 of transistor 10 is coupled to a clamping circuit comprising a rectifier D4 and a constant current source —V—R1, whereby the said base 17 is normally maintained at substantially ground potential. By this arrangement, therefore, each positive-going excursion of the power pulse source 12 will tend to effect current flow through the transistor 10 whereby positive-going output pulses will appear at each of the output terminals 14, 15 and 16.

Also coupled to the base 17 of transistor 10 is an input circuit, comprising one or more input points, such as 18, 19 and 20, coupled via rectifiers D5, D6 and D7, to the junction of the clamping circuit and the base 17 of the said transistor 10. Selective positive-going signals may accordingly be applied to any one of the input terminals 18 through 20; and these input signals tend to disconnect the clamp comprising rectifier D4 and source —V—R1, whereby the base 17 of transistor 10 is raised substantially to the potential of the positive-going signal input applied to the terminals 18, 19 and/or 20. It will be appreciated that if such an input signal should be applied during the occurrence of a positive-going power pulse, the transistor 10 will be rendered non-conductive notwithstanding the presence of the said power pulse. By this operation, therefore, the circuit acts as a complementing amplifier inasmuch as outputs are obtained in the absence of signal inputs and the presence of such a signal input inhibits an output.

It should be noted that the resistor R1 need only supply sufficient current to overcome the base current that flows when a power pulse is applied in the absence of an input. This current, being much less than the output current, and being the same current that must be overcome by the inputs to prevent an output, results in the device possessing a current gain, whereby the device can drive several other circuits of a similar or different nature.

Although the power pulses supplied by source 12 are both positive and negative going in potential, the transistor is selectively rendered conductive only during positive-going excursions of the said power pulses. The negative-going power pulse excursions nevertheless serve a valuable function by imposing a negative potential on the emitter 11 at times intermediate possible conduction of transistor 10 whereby residual carriers are rapidly removed from the lattice structure of the solid state material employed, thereby to rapidly clean up the transistor and prevent spurious operation. This provision for transistor clean-up thus permits the logical element to be operated at substantially higher repetition rates than has been the case heretofore.

When several stages, of the type shown in Figure 1, are to be connected in series, diode drops and drops occurring through conducting transistors may prevent the output pulses of a preceding stage from going to a voltage sufficiently high to prevent the power pulse of a later stage from turning the transistor on. Under certain circumstances, therefore, the clamp circuit comprising rectifier D4 and source —V—R1, may be modified somewhat thereby to make the voltage levels applied to the transistor more favorable to direct coupled operation. Figure 2 illustrates one such possible modification, and like numerals have been employed to designate those like elements of the circuit already described in reference to Figure 1. In the modified form shown in Figure 2, the resistor R1 is replaced by a voltage divider comprising resistors R2 and R3, and a capacitor C is placed in parallel with the resistor R2, as illustrated. A clamp rectifier D4 cooperates with the source —V—R3 in the manner already described in reference to the source —V—R1 of Figure 1; and by the interposition of the RC network comprising capacitor C and resistor R2, the operation of the circuit for direct coupled operation is improved substantially. Quiescently, the voltage drop across R2 will charge the capacitor C with its upper plate positive. An input signal will therefore cause the base of the transistor to rise above ground to a potential higher than that of the input pulse by an amount equal to the potential across capacitor C. Restoration of the charge on C lost during this process will occur when the input pulses are removed. Other means familiar to those skilled in the art may be used, such as level changing networks using resistors, batteries, and the like.

The foregoing forms of the invention have been described in reference to PNP type transistors. It will be appreciated, however, that NPN type transistors may also be employed; and that, in addition, both junction and point contact transistors may be utilized. It should further be noted that while the clamp circuit has been coupled to the transistor base thereby to cause the device normally to operate in a substantially grounded base circuit, grounded emitter and grounded collector circuits may also be employed, in accordance with the present invention; and the points of application of the power pulse source and the output or load will be modified accordingly. Still further modifications, such as using gate inputs instead of buffer inputs, multilayer gating, etc. will be suggested to those skilled in the art, and it must, therefore, be understood that the above description is meant to be illustrative only and should not be considered limitative of my invention. All such modifications as are in accord with the principles described are meant to fall within the scope of the appended claims.

Having thus described my invention, I claim:

1. A complementing amplifier comprising a transistor having plural electrodes, means applying spaced regularly occurring energization pulses to one of said electrodes, said spaced regularly occurring energization pulses exhibiting alternately occurring positive and negative going potential excursions, clamping means normally maintaining a predetermined potential on another of said electrodes whereby said transistor is normally conductive during excursions of said energization pulses of one polarity and is cleaned up during excursions of the opposite polarity, and means selectively applying a signal input to said clamping means thereby to disconnect said clamping means to render said transistor nonconductive during the occurrence of preselected ones of said energization pulses in response to said signal input.

2. A logical element comprising a transistor, means applying spaced regularly occurring energization pulses to the emitter of said transistor, said energization pulses exhibiting regularly occurring positive and negative going excursions of potential, output means coupled to the collector of said transistor, a clamp circuit coupled to the base of said transistor for normally maintaining a predetermined potential on said base whereby said transistor is selectively rendered conductive during potential excursions of one polarity and said transistor is thereafter cleaned up during a potential excursion of the opposite polarity, and means selectively applying signal inputs to the base of said transistor thereby to disconnect said clamp circuit from said base during preselected ones of said energization pulses.

References Cited in the file of this patent

UNITED STATES PATENTS 2,670,445 Felker ---------------- Feb. 23, 1954
2,745,956 Baker ----------------- May 15, 1956

OTHER REFERENCES

Proc. of the I. E. E. (British), September 1954, vol. 101, part III, No. 73, pp. 304–307, "The Transistor Regenerative Amplifier as a Computer Element." Chaplin.